Oct. 6, 1970      L. N. HAVENER      3,532,311
SPRING CLIP HANGER FOR CONDUIT AND THE LIKE
Filed May 1, 1968
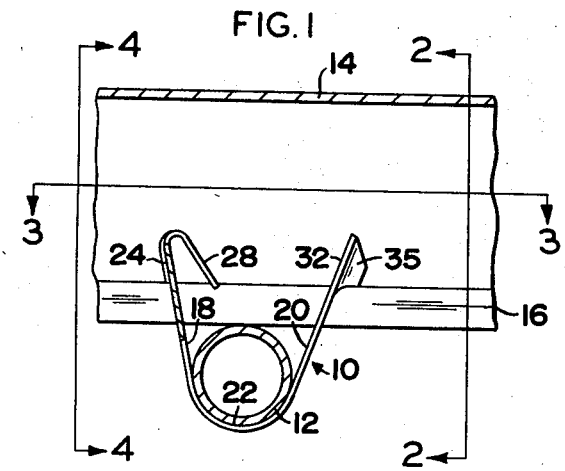
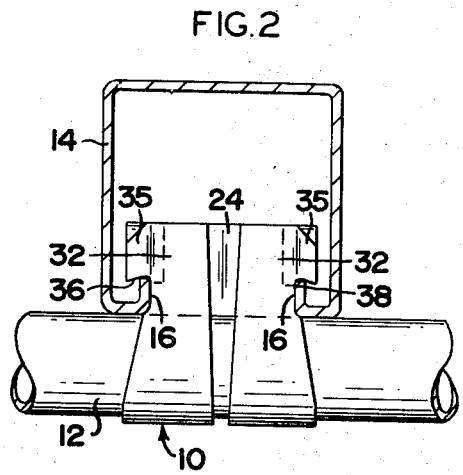
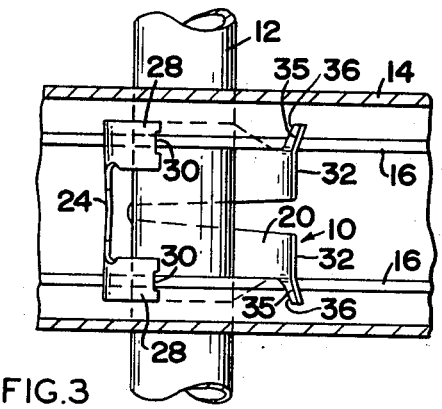
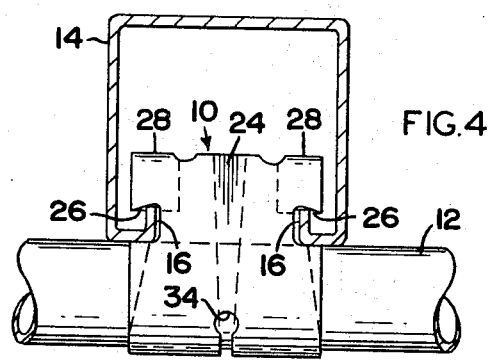
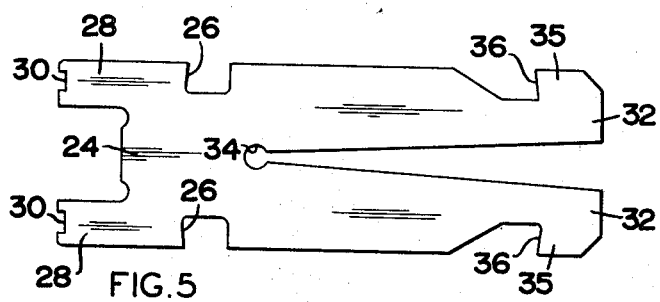
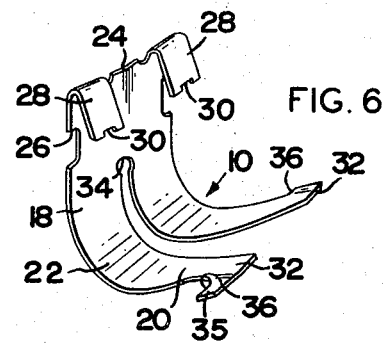
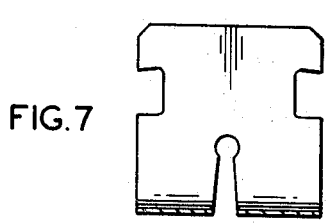
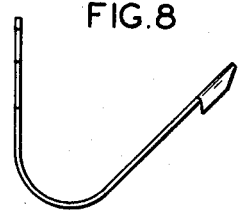
INVENTOR.
LESLIE N. HAVENER
BY
Meyer, Tilberry & Body
ATTORNEYS.

United States Patent Office 3,532,311
Patented Oct. 6, 1970

3,532,311
SPRING CLIP HANGER FOR CONDUIT AND THE LIKE
Leslie Newell Havener, Euclid, Ohio, assignor to Spring Steel Fasteners, Inc., Cleveland, Ohio
Filed May 1, 1968, Ser. No. 725,592
Int. Cl. F16l 3/02
U.S. Cl. 248—62                                           5 Claims

ABSTRACT OF THE DISCLOSURE

A spring clip in the form of a trough defined by opposed sidewalls integrally merged into a bight portion; one sidewall terminates in an upper reach portion which extends substantially the length of the trough, and is provided with shoulders for supportive engagement with a channel-shaped support; the other sidewall terminates in an upper reach portion defined by a pair of independently, yieldable legs, each having a shoulder for supportive engagement with a channel-shaped support.

---

This invention relates to the art of fasteners, and more particularly to an improved spring clip.

The present invention is particularly applicable for use in suspending an electrical conduit from a channel-shaped support member, and will be described with particular reference thereto; however, it will be appreciated that the invention has broader applications and may be used to secure any type of element generally cross-wise of a channel-shaped support member, as for example water pipes, electrical cable, gas lines and the like.

One of the most widely used, commercially available clamps for securing electrical conduit to channel-shaped support members, consists of a pair of bowed strap elements, preferably formed of metal such as steel, secured together with a threaded bolt and nut. This arrangement, advantageously, can be loosely installed so that minor lateral adjustments of the conduit along the channel-shaped support member can readily be effected before tightening the nut and bolt. The arrangement has the disadvantage of being expensive in that it consists of four separate components. Further, the installation of this four piece clamp is tedious, time consuming, and invariably requires two hands.

One piece spring type clips are known to the prior art, but these suffer the disadvantage of requiring a two hand installation, and once installed do not readily permit the lateral movement of the conduit along the channel-shaped support member to effect minor adjustments in alignment.

Thus there is a need for an inexpensive, one piece spring clip which can be readily installed with one hand, and in addition can be loosely or partially installed to permit lateral alignment of the conduit along the channel-shaped support member prior to final installation. The present invention is addressed to filling this need.

In accordance with the present invention there is provided, for use in securing an element generally cross-wise of a channel-shaped support member, a spring clip in the form of a trough, defined by opposed sidewalls integrally merged into a bight portion; one of the sidewalls terminating in an upper reach portion extending rigidly, substantially the length of the trough and having means for supportively engaging a channel-shaped support member; the other of the sidewalls terminating in an upper reach portion defined by a pair of legs, independently and sequentially yieldable in directions parallel to and laterally of the longitudinal axis of the trough, each of the legs having means for supportively engaging a channel-shaped support member.

It is therefore an object of the present invention to supply a spring clip of improved construction.

A further object of the invention is to provide a one piece spring clip which can be installed readily with one hand.

Still another object of the invention is to provide a spring clip which can be partially or loosely installed so as to be laterally movable along a channel-shaped member, before being finally installed.

These and other objects and advantages will become apparent from the following detailed description of a preferred embodiment of the invention when read in connection with the accompanying drawings, in which:

FIG. 1 is a schematic elevation view, with parts in section, showing a preferred embodiment of clip securing a conduit to a channel-shaped member.

FIG. 2 is a schematic section view taken generally along line 2—2 of FIG. 1;

FIG. 3 is a schematic sectional view taken generally along line 3—3 of FIG. 1;

FIG. 4 is a schematic sectional view taken generally along line 4—4 of FIG. 1;

FIG. 5 is a schematic pictorial view of a blank from which a preferred embodiment of spring clip is formed;

FIG. 6 is a schematic pictorial view of the preferred embodiment of spring clip formed from the blank illustrated in FIG. 5;

FIG. 7 is a schematic elevation view of a second embodiment of spring clip in accordance with the present invention; and, FIG. 8 is a schematic side elevation view of the spring clip illustrated in FIG. 7.

Referring now to the drawings wherein the showings are for the purposes of illustrating preferred embodiments of the invention only and not for the purpose of limiting same, FIGS. 1 through 4 show a spring clip designated generally as 10, supporting an element, illustrated as conduit 12, generally cross-wise of channel-shaped support member 14.

As best seen in FIG. 6, spring clip 10 is in the form of a trough defined by opposed sidewalls 18, 20, integrally merged into bight portion 22.

Sidewall 18 terminates in an upper reach portion 24, extending rigidly, substantially the length of the trough. Sidewall 18 is further provided with means for supportively engaging channel-shaped member 14, which in the preferred embodiment illustrated comprises a first pair of supportive shoulders 26, disposed in the plane of the sidewall, a pair of integral, folded over flaps 28, terminating in a second pair of supportive shoulders in the form of notches 30, disposed in a plane generally parallel to and displaced from the plane of sidewall 18.

With reference to FIGS. 1, 3 and 4, it will be seen that supportive shoulders 26 and notches 30 engage laterally displaced points along opposed flanges 16 of channel-shaped member 14.

Referring again to FIG. 6, it will be seen that sidewall 20 terminates in an upper reach portion defined by a pair of legs 32, separated by a V-shaped notch, which legs extend the full length of sidewall 20, through bight portion 22, terminating in a crotch 34 formed in sidewall 18.

Each of legs 32 is provided with means for supportively engaging channel-shaped support member 14, which in the preferred embodiment illustrated take the form of wings 35 provided with shoulders 36, adapted to engage opposed flanges 16 of the channel-shaped support member. See FIGS. 2 and 3.

Spring clip 10 may be formed of any suitable resilient material, such as plastics, including polypropylene and ABS (acrylonitrile-butadiene-styrene) resins, but is preferably formed of a resilient metal, such as spring steel. When constructed of plastic, the clip would be directly injection molded or otherwise formed into the trough shape illustrated in FIG. 6. When constructed of metal, a flat blank as illustrated in FIG. 5 would be formed. The blank would be then shaped into a trough configuration as illustrated in FIG. 6, and tempered as required to develop resiliency.

In the preferred embodiment illustrated, sidewall 18 is bowed convexly away from the longitudinal axis of the trough, as is best illustrated in FIG. 3. This bowing has the effect of parting legs 32, and thereby increasing the force required to engage shoulders 36 and flanges 16, and concomitantly increasing the bearing pressure of the shoulders against the flanges in the completed installation. This increases the rigidity of the clamping arrangement, which becomes an important consideration where the supported element is especially heavy, or is subjected to vibration or other external forces.

Due to the construction of spring clip 10, legs 32 are independently and sequentially yieldable in directions parallel to and laterally of the longitudinal axis of the trough. Thus, in installing the clip, legs 32 may be individually manipulated to effect an engagement between shoulder 36 and flange 16 of channel-shaped support member 14.

As previously mentioned, one of the virtues of the spring clip of the present invention, is that it can be partially or loosely installed to permit lateral movement of the clip along the channel-shaped support member so as to allow alignment of the conduit or other supported member, with respect to the support member. This is accomplished by initially engaging the spring clip with the channel-shaped support member, only through the supportive means provided on sidewall 18. In other words, the initial step of installation is to engage supportive shoulders 26 and notches 30 with spaced points along opposed flanges 16 on channel-shaped support member 14. Wings 35 and shoulders 36 remain outside and below channel-shaped support member 14. In this partially installed configuration, spring clip 10 will not only support its own weight, but will also support the weight of conduit 12.

This partial installation may be accomplished in one of two ways. If the clip is to be positioned near a terminal end of channel-shaped support member 14, shoulders 26 and notches 30 may be brought into engagement with flanges 16 by sliding the spring clip onto the channel-shaped support member from the terminal end of the latter. If the spring clip is to be installed intermediate terminal portions of a channel-shaped support member, sidewall 18 is initially placed within the channel-shaped member so that the longitudinal axis of the trough is parallel to the longitudinal axis of the channel. Thereafter the spring clip is rotated 90° so that the longitudinal axis of the trough is turned perpendicular to the longitudinal axis of the channel, and shoulders 26 and notches 30 are brought into engagement with opposed flanges 16.

Legs 32 may then be flexed downwardly to facilitate the entry of conduit 12 into bight portion 22 of the spring clip. Lateral adjustment of the conduit and spring clip along the channel-shaped support member may then be accomplished by simply sliding the conduit and the partially installed spring clip along the channel-shaped support member. When alignment has been achieved, legs 32 are then individually and sequentially pushed upwardly into the channel-shaped member until wing 32 extends beyond flange 16, permitting the leg to spring outwardly so that shoulder 36 engages flange 16. When both legs have been manipulated in this fashion, a very rigid and secure installation is achieved.

Disassembly of the spring clip is effected in precisely the reverse manner of the installation procedure described above. This is readily accomplished by placing a screwdriver blade at point 38 shown in the FIG. 2 and pushing inwardly and upwardly to disengage shoulder 36 from flange 16. Leg 32 will then spring downwardly and out of channel-shaped support member 14. The second leg 32 is disengaged in the same manner, and the rest of the disassembly procedure becomes obvious.

FIGS. 7 and 8 illustrate a second embodiment of the invention, which is substantially the same as the preferred embodiment except that flaps 28 and notches 30 are omitted. This modified form of spring clip is even less expensive to manufacture and easier to install than the preferred embodiment, at only a slight sacrifice of stability in its partially installed configuration due to the fact that only two point rather than four point contact with flanges 16 is provided for.

The modified embodiment may be used as a replacement for the preferred configuration, or in combination therewith. For example, a conduit may be secured to a channel-shaped support member by using the preferred embodiment of the spring clip to secure the distal ends of the conduit, while support for immediate portions of the conduit may be provided by the modified form of spring clip.

The present invention has been described in conjunction with certain structural embodiments; however, it will be appreciated that various structural changes may be made in the illustrated embodiments without departing from the intended scope and spirit of the present invention as defined in the appended claims.

Having thus described my invention, I claim:

1. For use in securing an element generally cross-wise of a channel-shaped support member, a spring clip in the form of a trough defined by opposed sidewalls integrally merged into a bight portion; one of said sidewalls terminating in an upper reach portion extending rigidly, substantially the length of said trough and having means for supportively engaging a channel-shaped support member; the other of said sidewalls terminating in an upper reach portion defined by a pair of legs, independently and sequentially yieldable in directions parallel to and laterally of the longitudinal axis of said trough, each of said legs having means for supportively engaging a channel-shaped support member.

2. The spring clip as defined in claim 1 wherein said legs extend the full length of said other sidewall through said bight portion terminating in a crotch formed in said one sidewall.

3. The spring clip as defined in claim 2 wherein said legs are separated by a V-shaped notch having its apex terminating in said crotch.

4. For use in securing an element generally crosswise of a channel-shaped support member, a spring clip in the form of a trough defined by opposed sidewalls integrally merged into a bight portion; one of said sidewalls terminating in an upper reach portion extending rigidly, substantially the length of said trough and having means for supportively engaging a channel-shaped support member; the other of said sidewalls terminating in an upper reach portion defined by a pair of legs, independently and sequentially yieldable in directions parallel to and laterally of the longitudinal axis of said trough, each of said legs having means for supportively engaging a channel-shaped support member, said first mentioned sidewall being bowed convexly away from the longitudinal axis of said trough, effecting a separation of said legs.

5. For use in securing an element generally crosswise of a channel-shaped support member, a spring clip in the form of a trough defined by opposed sidewalls integrally merged into a bight portion; one of said sidewalls terminating in an upper reach portion extending rigidly, substantially the length of said trough and having means for supportively engaging a channel-shaped support member comprising a first pair of supportive shoulders disposed in the plane of said one sidewall and a second pair of supportive shoulders disposed in a plane parallel to and displaced from said first mentioned plane; the other of said sidewalls terminating in an upper reach portion defined by a pair of legs, independently and sequentially yieldable in directions parallel to and laterally of the longitudinal axis of said trough, each of said legs having means for supportively engaging a channel-shaped support member.

References Cited

UNITED STATES PATENTS

| | | | |
|---|---|---|---|
| 2,231,153 | 2/1941 | Camiener | 248—73 X |
| 2,674,431 | 4/1954 | Attwood | 248—73 X |
| 2,729,412 | 1/1956 | Amesbury | 248—68 |
| 2,863,625 | 12/1958 | Attwood | 248—68 X |
| 2,918,240 | 12/1959 | Wiegand | 248—71 |
| 3,226,069 | 12/1965 | Clarke | 248—68 |

CHANCELLOR E. HARRIS, Primary Examiner

U.S. Cl. X.R.

24—73; 248—73, 301